UNITED STATES PATENT OFFICE.

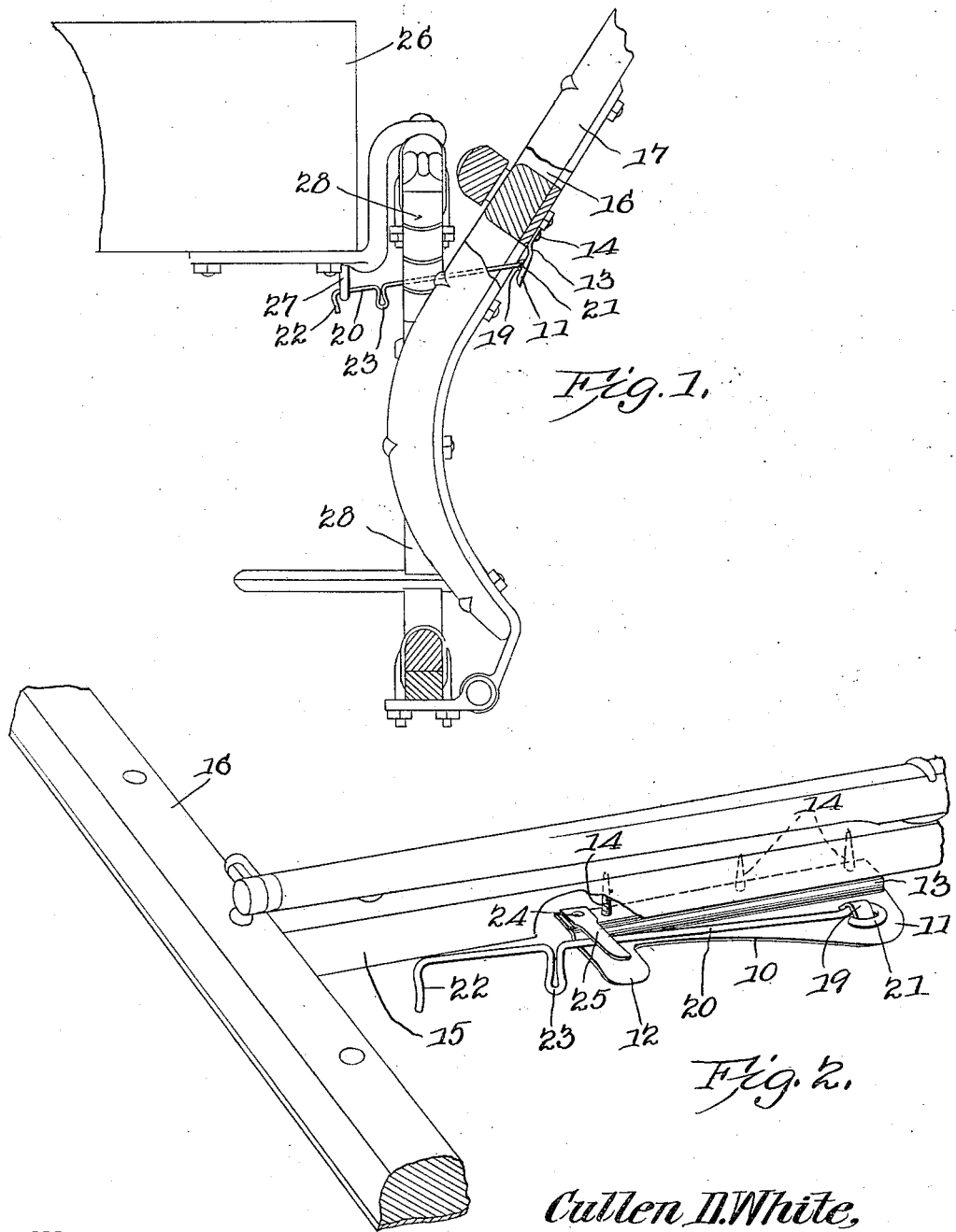

CULLEN D. WHITE, OF UNION CITY, TENNESSEE.

VEHICLE-SHAFT SUPPORT.

No. 869,950.

Specification of Letters Patent.

Patented Nov. 5, 1907.

Application filed April 27, 1906. Serial No. 314,039.

*To all whom it may concern:*

Be it known that I, CULLEN D. WHITE, a citizen of the United States, residing at Union City, in the county of Obion and State of Tennessee, have invented a new and useful Vehicle-Shaft Support, of which the following is a specification.

This invention relates to attachments for the thills or shafts of vehicles for supporting them in an elevated position when not in use, and has for its object to provide a simply constructed and conveniently arranged device which may be readily attached to any size or form of thills or shafts, and projected for detachable connection to a suitable support or catch upon the body of the vehicle.

With this and other objects in view which will appear as the nature of the invention is better understood, the invention consists in certain novel features of construction as hereafter fully described and claimed.

In the accompanying drawings forming a part of this specification and in which corresponding parts are denoted by like designating characters, is illustrated a preferred embodiment of the invention capable of carrying the same into practical operation.

In the drawings:—Figure 1 is a side elevation, partly in section, of a portion of a vehicle body, the forward axle, and the forward spring and the connecting bolster and spring bars together with a portion of the thills and the connecting cross-bar, with the improved implement applied. Fig. 2 is a perspective view of a portion of one of the thills, a portion of the cross-bar, and a portion of the swingle tree, with the improved device applied to the cross-bar.

The improved device comprises a metal plate 10, preferably of steel, and pressed or bent into the required shape and provided with lateral projections 11—12 at the ends, the plate formed with a longitudinal depression 13 and provided with spaced apertures to receive the holding screws 14 by which the plate is secured to the under surface of the cross-bar 15 of the thills 16—17, and projecting rearwardly of the same.

The projection 11 is provided with a clip 19 from which an arm 20 is arranged to swing by means of an eye 21 at one end of the arm, the arm having a hook 22 at the free end and with an intermediate loop 23 to form a convenient grip for the fingers of the operator.

Attached at 24 to the plate 10 is a spring plate 25, projecting over the projection 12, and forming a yieldable socket into which the bar 20 is forced, when not in use, as shown in Fig. 2.

Depending from the body portion of the vehicle, represented at 26 is a loop or eye 27 with which the hook 22 of the arm 20 is engaged when the thills are disposed in elevated position, as shown in Fig. 1, the arm extending through the spring represented at 28.

The plate 10 and its attached arm, projecting for a short distance only rearwardly of the cross-bar 15, do not interfere with the horse, or with the running gear of the vehicle, and do not detract in any manner from the appearance of the vehicle, as the device is practically concealed from view when not in use.

When the horse is unhitched, the thills are elevated, the arm 20 detached by means of the grip 23, and the hook 22 engaged with the stop 27, thereby firmly supporting the thills in elevated position.

The device is simple in construction, can be inexpensively manufactured, and operates effectually for the purposes described.

Having thus described the invention, what is claimed as new is:—

1. A thill support comprising a plate having a pair of lateral extensions, an arm pivotally connected with one of the extensions and having its free end provided with a hook to engage a stop on a vehicle body, and a resilient arm-retaining clip secured to the plate and bridging the other extension thereby to hold the arm in inoperative position.

2. A thill support comprising a plate provided with a longitudinal depression and having a pair of lateral extensions, an arm pivotally connected with one of the extensions and having its free end provided with a hook to engage a stop on a vehicle body, and a resilient arm-retaining clip secured to the plate and bridging the other extension, whereby to hold the arm in the depression when in inoperative position.

In testimony that I claim the foregoing as my own, I have hereto affixed my signature in the presence of two witnesses.

CULLEN D. WHITE.

Witnesses:
GEO. R. KENNEY,
T. G. HAYDEN.